(12) United States Patent
Satoh et al.

(10) Patent No.: US 7,471,496 B2
(45) Date of Patent: Dec. 30, 2008

(54) SOLENOID DRIVING APPARATUS

(75) Inventors: Kiyokatsu Satoh, Niiza (JP); Junichi Katoh, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/265,181

(22) Filed: Nov. 3, 2005

(65) Prior Publication Data

US 2006/0098376 A1    May 11, 2006

(30) Foreign Application Priority Data

Nov. 9, 2004  (JP)  ............................ 2004-325103

(51) Int. Cl.
*H01H 47/00*  (2006.01)
(52) U.S. Cl. .................................................. 361/152
(58) Field of Classification Search ................ 361/190, 361/152
See application file for complete search history.

(56) References Cited

U.S. PATENT DOCUMENTS

| 5,267,545 | A | * | 12/1993 | Kitson | 123/490 |
| 5,469,825 | A | * | 11/1995 | Golab et al. | 123/479 |
| 5,914,849 | A | * | 6/1999 | Perreira | 361/187 |
| 6,078,204 | A | * | 6/2000 | Cooper et al. | 327/309 |
| 6,216,678 | B1 | * | 4/2001 | James et al. | 123/594 |
| 6,584,961 | B2 | * | 7/2003 | Marceca et al. | 123/490 |
| 6,721,158 | B2 | * | 4/2004 | Heinke | 361/152 |
| 2002/0104494 | A1 | * | 8/2002 | Ozawa et al. | 123/90.11 |

FOREIGN PATENT DOCUMENTS

| JP | 54048150 A | * | 4/1979 |
| JP | 2001-117651 | | 4/2001 |

* cited by examiner

*Primary Examiner*—Stephen W Jackson
*Assistant Examiner*—Ann T Hoang
(74) *Attorney, Agent, or Firm*—Oblon, Spivak, McClelland, Maier & Neustadt, P.C.

(57) ABSTRACT

A solenoid driving apparatus that drives a solenoid by intermittently supplying an exciting current comprises a first current switching element turned ON and OFF so as to switchably allow and block passage of the exciting current supplied to the solenoid L, a loop current circuit 3 being connected to the first current switching element and passing a loop current caused by stored energy in the solenoid when the supply of the exciting current to the solenoid is stopped by the first current switching element, and a second current switching element being disposed between the solenoid and a junction of the first current switching element and the loop current circuit, and being turned ON and OFF so as to switchably allow and block passage of the exciting current and the loop current.

9 Claims, 5 Drawing Sheets

SOLENOID DRIVING APPARATUS

BACKGROUND OF THE INVENTION

The present invention relates to a solenoid driving apparatus for driving a solenoid that is used, for example, for various controls of automobiles.

As a solenoid driving apparatus for driving a solenoid, a constant-current driving circuit for inductive loads has been known, which has semiconductor integrated circuits for driving inductive loads, as disclosed in Japanese Patent Application Laid-Open No. 2001-117651.

FIG. 1 shows a typical circuit of a conventional solenoid driving apparatus. This solenoid driving apparatus includes a first current switching element 1, a second current switching element 2a, a third current switching element 3, a battery E, a solenoid L, a resistor R, zener diodes ZD1 and ZD2, a diode D4, an inverter 4, and a control circuit 5.

The first current switching element 1 has a transistor Q1 in the form of an N-channel MOSFET, and a diode D1 connected between the source and drain of the transistor Q1. The second current switching element 2a has a transistor Q2 in the form of an N-channel MOSFET, and a diode D2 connected between the source and drain of the transistor Q2. The third current switching element 3 has a transistor Q3 in the form of an N-channel MOSFET, and a diode D3 connected between the source and drain of the transistor Q3. Each of these diodes D1 to D3 is a parasitic diode.

The drain of the transistor Q1 is connected to the positive terminal of the battery E, and the negative terminal of the battery E is grounded. The source of the transistor Q1 is connected to the source of the transistor Q2, and the gate of the transistor Q1 is connected to the control circuit 5. The drain of the transistor Q2 is connected to the drain of the transistor Q3, and the gate of the transistor Q2 is connected to the control circuit 5. The source of the transistor Q3 is grounded, and the gate of the transistor Q3 is connected to the output end of the inverter 4. The input end of the inverter 4 is connected to the control circuit 5 and the gate of the transistor Q1.

One end of the solenoid L is connected to a junction A of the source of the transistor Q1 and the source of the transistor Q2, and the other end of the solenoid L is grounded. A resistor R is connected between the gate and source of the transistor Q2. The gate of the transistor Q2 is grounded through a series connection of a zener diode ZD1, a zener diode ZD2, and a diode D4.

In the solenoid driving apparatus, when an exciting current is supplied from the battery E to the solenoid L, a control signal S1 is fed from the control circuit 5, and in response thereto, the first current switching element 1 is brought into a conductive state and the third current switching element 3 is brought into a non-conductive state. As a result, the flow of the exciting current into the second and the third current switching elements 2a and 3 is blocked, and the exciting current is supplied to the solenoid L.

On the other hand, when the supply of the exciting current to the solenoid L is suspended, the first current switching element 1 is brought into a non-conductive state and the third current switching element 3 is brought into a conductive state in response to the control signal S1, and at the same time, the second current switching element 2a is brought into a conductive state in response to a control signal S2 fed from the control circuit 5.

As results, a loop current caused by the energy stored in the solenoid L passes through the second and the third switching elements 2a and 3. In this manner, the supply of the exciting current and the suspension thereof are made repetitively by using the control signals S1 and S2 according to PWM control, thereby achieving a constant-current control for the solenoid L.

When the constant-current control for the solenoid L is terminated, the first and the second current switching elements 1 and 2a are brought into a non-conductive state and the third current switching element 3 is brought into a conductive state in response to the control signals Si and S2. Consequently, in the second current switching element 2a, a constant-voltage operation is made by the zener diodes ZD1 and ZD2 as well as the diode D4. These are connected in series between the gate of the transistor Q2 and the ground. The energy stored in the solenoid L is released in a short time by this constant-voltage operation.

SUMMARY OF THE INVENTION

In order to improve the constant-current accuracy of the constant-current control for the solenoid L in the conventional solenoid driving apparatus shown in FIG. 1, it is necessary to control the pulse width of the control signal S1 by measuring the value of a current passing through the solenoid L and informing the control circuit 5 of the measured current value as feedback.

For measurement of the current value, a high-accuracy resistor with a low resistance is generally used as a current detecting resistor. However, it is quite difficult to incorporate this resistor into a semiconductor chip because of constraints on area efficiency, current capacity, temperature characteristics, and the like. Therefore, when a current detecting circuit is formed in the semiconductor chip, a current detecting element is generally used which is connected in parallel to a current switching element and allows the passage of several hundredths or thousandths of a current passing through the current switching element.

FIG. 2 shows the circuit of the conventional solenoid diving apparatus in which a current detecting circuit using current detecting elements is employed. The solenoid driving apparatus has the circuitry shown in FIG. 1, and further includes a transistor Q10, a transistor Q20, a current detecting element r1, a current detecting element r2, a differential amplifier 10, a differential amplifier 12, and comparators 11 and 13.

In FIG. 2, the drain of the transistor Q10 is connected to the drain of the transistor Q1, and the gate of the transistor Q10 is connected to the gate of the transistor Q1. The source of the transistor Q10 is connected to the source of the transistor Q1 via the current detecting element r1. In the same manner, the drain of the transistor Q20 is connected to the drain of the transistor Q2, the gate of the transistor Q20 is connected to the gate of the transistor Q2, and the source of the transistor Q20 is connected to the source of the transistor Q2 via the current detecting element r2.

Both ends of the current detecting element r1 are connected to an inverting input terminal and a non-inverting input terminal of the differential amplifier 10. The output end of the differential amplifier 10 is connected to a non-inverting input terminal of the comparator 11. To an inverting input terminal of the comparator 11, a reference voltage ref1 is applied, and the output terminal of the comparator 11 is connected to the control circuit 5.

Furthermore, both ends of the current detecting element r2 are connected an inverting input terminal and a non-inverting input terminal of the differential amplifier 12. The output terminal of the differential amplifier 12 is connected to a non-inverting input terminal of the comparator 13. A reference voltage ref2 is applied to an inverting input terminal of the comparator 13, and the output terminal of the comparator 13 is connected to the control circuit 5. The control circuit 5 becomes operative in response to a control signal that is inputted externally, and generates and outputs a control signal S1 for PWM control according to an output of the comparator 11 and an output of the comparator 13.

In the solenoid driving apparatus, the current value of the exciting current supplied to the solenoid L is detected by the differential amplifier 10 as a voltage applied to the current detecting element r1 connected to the source of the transistor Q10, and when this voltage is determined to reach or exceed the reference voltage ref1 by the comparator 11, this information is provided to the control circuit 5. In the same manner, the current value of the loop current caused by the energy stored in the solenoid L is detected by the differential amplifier 12 as a voltage applied to the current detecting element r2 connected to the source of the transistor Q20, and when this voltage is determined to fall down to or below the reference voltage ref1 by the comparator 13, this information is provided to the control circuit 5. The control circuit 5 determines the pulse width of the control signal S1 according to signals outputted from the comparators 11 and 13.

However, the conventional solenoid driving apparatus is configured so that the path used for supplying a current from the battery E to the solenoid L is provided independently of the path over which the loop current caused by the stored energy in the solenoid L passes therethrough as described above. Therefore, as shown in FIG. 2, it is necessary to provide a current detecting circuit including the current detecting element r1, the differential amplifier 10, and the comparator 11, and another current detecting circuit including the current detecting element r2, the differential amplifier 12, and the comparator 13, in relation to the first current switching element 1 and the second current switching element 2, respectively.

Accordingly, the size of the current detecting circuit increases, and the amount of time and effort required for adjusting the constant-current value also increases. Furthermore, the measured current value contains errors in the two circuits, which disadvantageously does not lead to an improvement in current detection accuracy.

According to the present invention, the current passing through a solenoid can be controlled very accurately, and an inexpensive solenoid driving apparatus can be provided.

In order to solve the above problems, units mentioned below are employed. According to a first technical aspect of the present invention, there is provided a solenoid driving apparatus that drives a solenoid by intermittently supplying thereto an exciting current. The solenoid driving apparatus comprises: a first current switching element that opens and closes so as to switchably allow and block passage of the exciting current supplied to the solenoid; a loop current circuit that is connected to the first current switching element and passes a loop current caused by stored energy in the solenoid when the supply of the exciting current to the solenoid is stopped by the first current switching element; and a second current switching element that is disposed between the solenoid and a junction of the first current switching element and the loop current circuit, and opens and closes so as to switchably allow and block passage of the exciting current and the loop current.

According to a second technical aspect of the present invention, the loop current circuit includes a third current switching element that opens and closes exclusively against the first current switching element.

According to a third technical aspect of the present invention, the solenoid driving apparatus further comprises a control circuit that generates a control signal for controlling opening and closing of the second current switching element, and the second current switching element operates as a current switching element when the control signal is received from the control circuit and operates as a constant-voltage circuit when no control signal is received.

According to a fourth technical aspect of the present invention, the solenoid driving apparatus of the first or the second technical aspect comprises: a current detector that detects a value of a current passing through the second current switching element, and a control circuit that generates a control signal for controlling opening and closing of the first current switching element according to the current value detected by the current detector.

DESCRIPTION OF THE PREFFERED EMBODIMENTS

Figure 1:
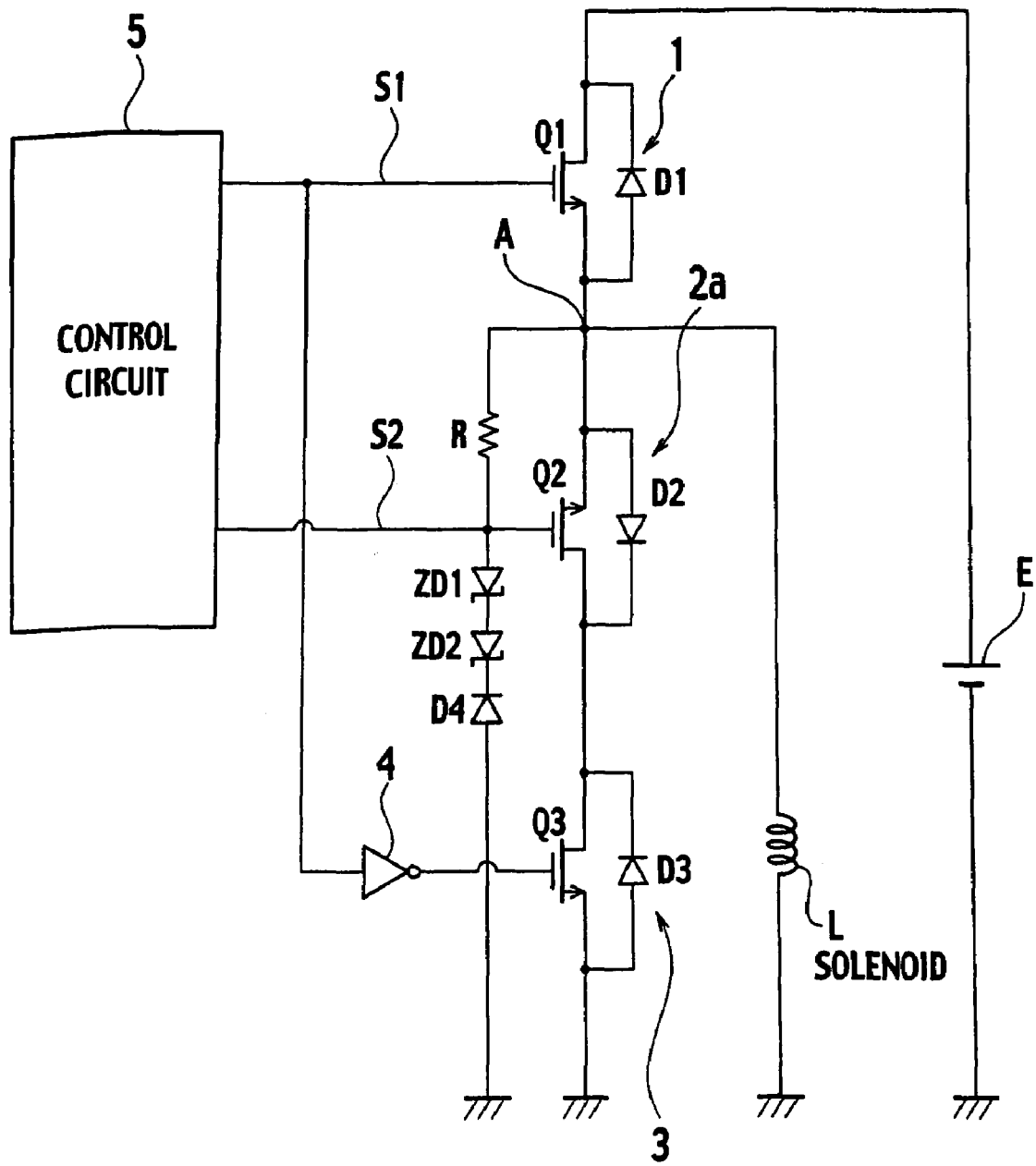
FIG. 1 is an explanatory diagram of a conventional solenoid driving apparatus.
Figure 2:
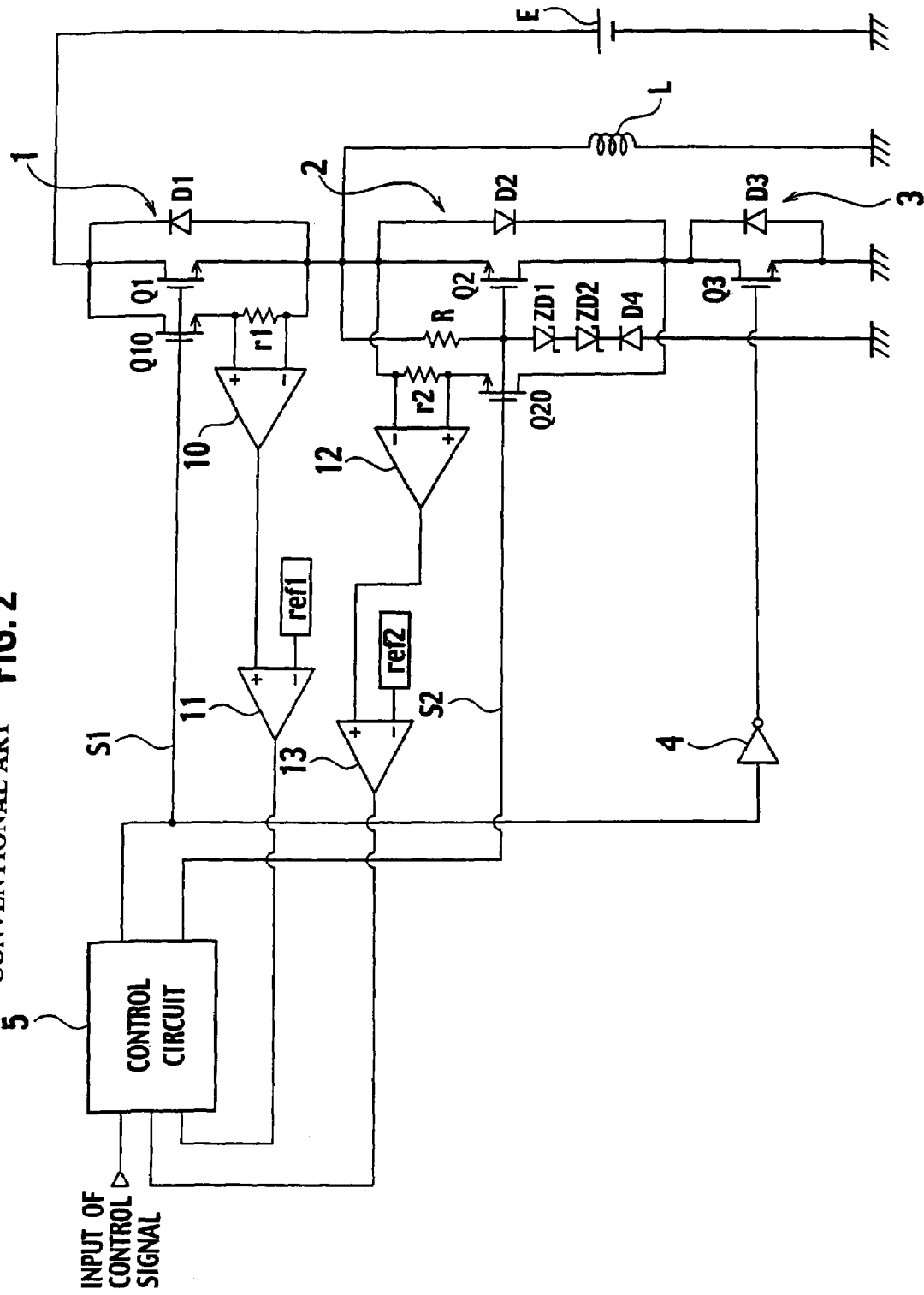
FIG. 2 is an explanatory diagram of another conventional solenoid driving apparatus.

Preferred embodiments a solenoid driving apparatus according to the present invention will be explained below in detail with reference to the accompanying drawings. Like or corresponding constituent elements to those in the background of the invention are explained while being designated with like reference numerals.

First Embodiment

Figure 3:
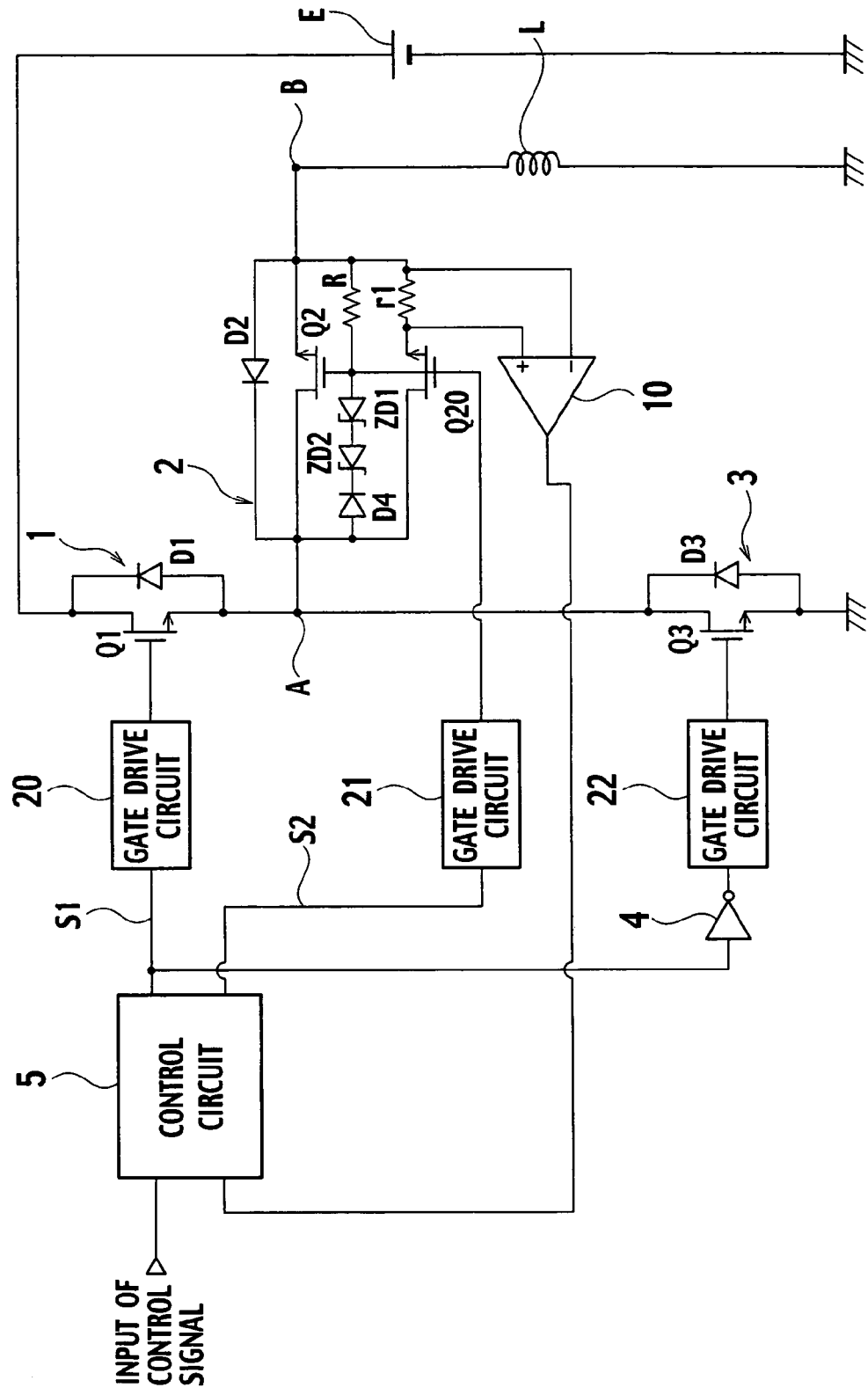
FIG. 3 shows the circuit structure of a solenoid driving apparatus according to a first embodiment of the present invention.

FIG. 3 shows a circuit structure of a solenoid driving apparatus according to a first embodiment of the present invention. The solenoid driving apparatus comprises a first current switching element 1, a second current switching element 2, a third current switching element 3, a battery E, a solenoid L, a resistor R, a zener diode ZD1, a zener diode ZD2, a diode D4, an inverter 4, a control circuit 5, a transistor Q20, a current detecting element r1, a differential amplifier 10, and gate drive circuits 20, 21, and 22. A loop current circuit of the present invention corresponds to the third current switching element 3. A current detector of the present invention comprises the transistor Q20, the current detecting element r1, and the differential amplifier 10.

The first current switching element 1 includes a transistor Q1 in the form of an N-channel MOSFET, and a diode D1 connected between the source and drain of the transistor Q1. The second current switching element 2 includes a transistor Q2 in the form of an N-channel MOSFET, and a diode D2 connected between the source and drain of the transistor Q2. The third current switching element 3 includes a transistor Q3 in the form of an N-channel MOSFET, and a diode D3 connected between the source and drain of the transistor Q3. Each of these diodes D1 to D3 is a parasitic diode.

The drain of the transistor Q1 is connected to the positive terminal of the battery E, and the negative terminal of the battery E is grounded. The source of the transistor Q1 is connected to a junction A of the drain of the transistor Q2 and the drain of the transistor Q3, and the gate of the transistor Q1 is connected to the output end of the gate drive circuit 20. The source of the transistor Q2 is connected to one end of the solenoid L at a junction B, and the gate of the transistor Q2 is connected to the output end of the gate drive circuit 21. The other end of the solenoid L is grounded. The source of the transistor Q3 is grounded, and the gate of the transistor Q3 is connected to the output end of the gate drive circuit 22.

The gate drive circuit 20 generates a drive signal according to a control signal S1 being outputted from the control circuit 5, and sends the drive signal to the gate of the transistor Q1. The gate drive circuit 21 also generates a drive signal according to a control signal S2 being outputted from the control circuit 5, and sends the drive signal to the gate of the transistor Q2. The gate drive circuit 22 generates a drive signal according to a signal that is obtained by inverting the control signal S1 being outputted from the control circuit 5 at the inverter 4, and sends the drive signal to the gate of the transistor Q3.

The resistor R is connected between the gate and source of the transistor Q2. The zener diode ZD1, the zener diode ZD2, and the diode D4 are connected in series between the gate and drain of the transistor Q2.

The drain of the transistor Q20 is connected to the drain of the transistor Q2, the gate of the transistor Q20 is connected to the gate of the transistor Q2, and the source of the transistor Q20 is connected to the source of the transistor Q2 via the current detecting element (impedance element) r1. Both ends of the current detecting element r1 are connected to an inverting input terminal and a non-inverting input terminal of the differential amplifier 10. The output terminal of the differential amplifier 10 is connected to the control circuit 5.

The control circuit 5 is activated in response to a control signal that is inputted externally. The control circuit 5 generates and outputs the control signal S2 for turning the second current switching element 2 ON and OFF, and also generates and outputs the control signal S1 for providing PWM control according to an output of the differential amplifier 10.

The control signal S1 outputted from the control circuit 5 is fed to the gate of the first current switching element 1 via the gate drive circuit 20, and is fed also to the gate of the third current switching element 3 via the gate drive circuit 22 after inverted by the inverter 4. Therefore, the first current switching element 1 and the third current switching element 3 are turned ON and OFF in a mutually exclusive manner.

Figure 4:
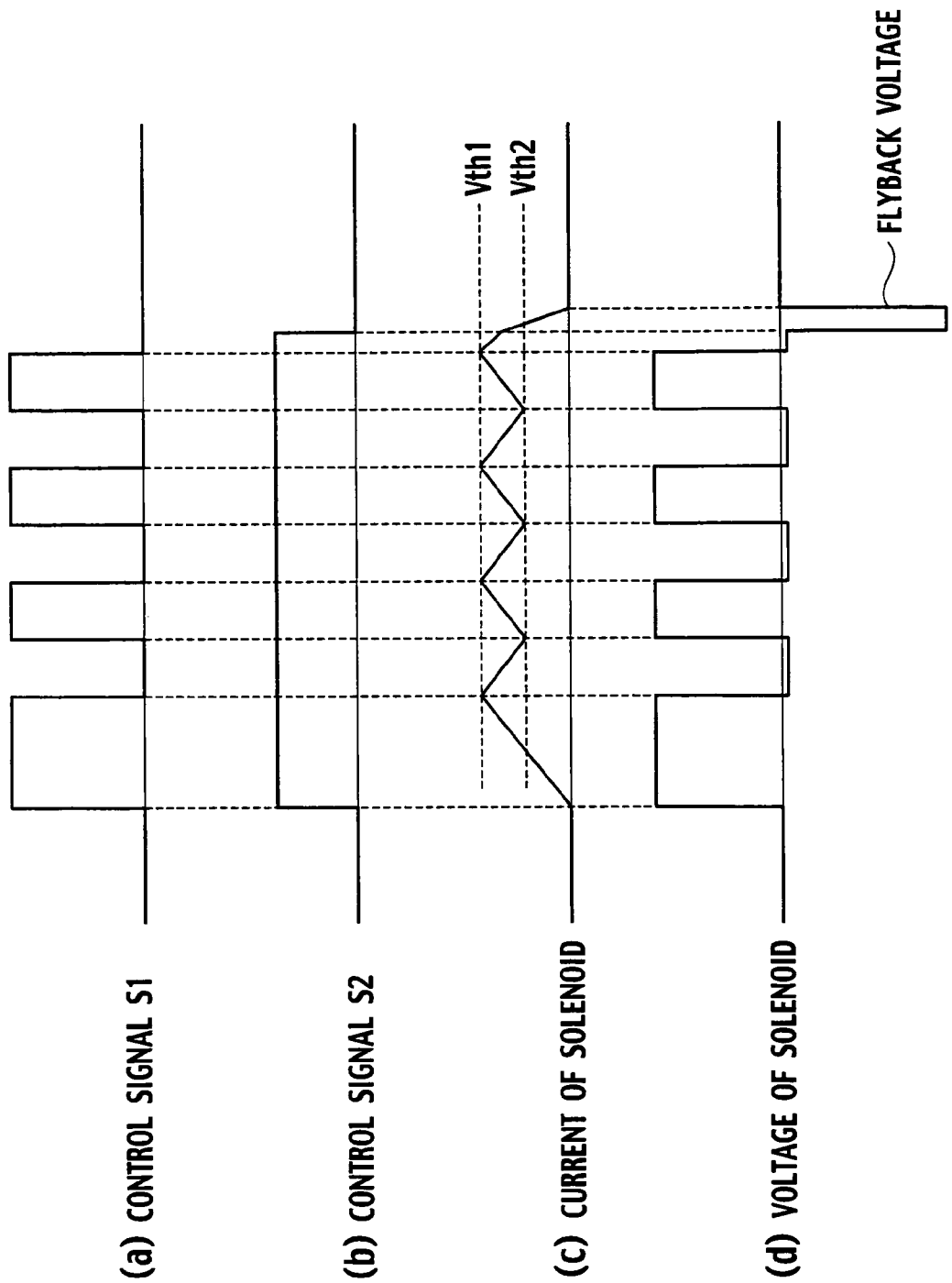
FIG. 4 is a timing chart for explaining operations of the solenoid driving apparatus according to the first embodiment.

Operations of thus configured solenoid driving apparatus according to the first embodiment of the present invention will be described with reference to the timing chart of FIG. 4.

First, operations for constant-current control of the solenoid L are described below. When an exciting current is supplied to the solenoid L, the second current switching element 2 is brought into a conductive state in response to the control signal S2 as shown in FIG. 4(b), and at the same time, the first current switching element 1 is brought into a conductive state and the third current switching element is brought into a non-conductive state in response to the control signal S1 (shown in FIG. 4(a)) being outputted from the control circuit 5. Accordingly, voltage is applied to the solenoid L as shown in FIG. 4(d), and the exciting current is supplied from the battery E to the solenoid L by way of the first and the second current switching elements 1 and 2. This exciting current gradually increases with the slope determined by an inductance of the solenoid L.

When the supply of the exciting current to the solenoid L is suspended, the second current switching element 2 remains in a conductive state according to the control signal S2, and the first current switching element 1 is brought into a non-conductive state and the third current switching element 3 is brought into a conductive state in response to the control signal S1. Therefore, the loop current caused by the energy stored in the solenoid L passes through the third current switching element 3 and the second current switching element 2. This loop current gradually decreases with the slope determined by an inductance of the solenoid L.

In parallel with the above operations, the magnitude of the exciting current and loop current passing through the second current switching element 2 are detected by a current detecting circuit which includes the transistor Q20, the current detecting element r1, and the differential amplifier 10. Specifically, a detection voltage corresponding to the current passing through the current detecting element r1 is outputted by the differential amplifier 10 to the control circuit 5. The control circuit 5 generates and outputs a control signal S1 to stop the supply of the exciting current to the solenoid L when the detection voltage of the differential amplifier 10 (error voltage) increases to a first threshold value Vth1 as shown in FIG. 4(c). In response thereto, the loop current caused by the energy stored in the solenoid L starts to flow.

The control circuit 5 stops the pass of the loop current when the detection voltage of the differential amplifier 10 decreases to a second threshold value Vth2 as shown in FIG. 4(c), and generates and outputs a control signal S1 to turn on/off the first current switching element 1. In response, the exciting current of the solenoid L gradually increases again with the slope determined by an inductance of the solenoid L.

As described above, the PWM control is performed by the intermittent on/off operations of the first and the third current switching elements 1 and 3 in response to the control signal S1, so that the constant-current control for the solenoid L is provided.

When the constant-current control for the solenoid L is terminated, the control signals S1 and S2 are fed from the control circuit 5, and in response, the first and the second current switching elements 1 and 2 are brought into a non-conductive state. Thus, the second current switching element 2 makes a constant-voltage operation by use of the zener diodes ZD1 and ZD2 connected between the drain and gate of the second current switching element 2.

Specifically, as shown in FIG. 4(c), when the second current switching element 2 is turned off by the control signal S2, a flyback voltage is generated at the solenoid L, and therefore the detected voltage corresponding to the current passing through the solenoid L exceeds the threshold value of the zener diodes ZD1 and ZD2 provided between the drain and gate of the second current switching element 2. Therefore, a voltage being determined by the diode D4 connected to the zener diodes ZD1 and ZD2 in series and the gate voltage of the second current switching element 2 appears at the second current switching element 2, and consequently the solenoid L releases exciting energy in a short time.

As described above, according to the solenoid driving apparatus in the first embodiment, the second current switching element 2 is provided at the position where the path used for supplying the exciting current from the battery E to the solenoid L and the path through which the loop current passes due to the stored energy in the solenoid L overlap each other, so that the energy stored in the solenoid L can be released in a short time by the constant-voltage operation, and also the constant-current control can be provided with high accuracy.

Compared to a conventional solenoid driving apparatus to which the conventional current detecting circuits are applied, the number of the current detecting circuits of the present invention can be decreased to half, so that the size of the circuitry can be reduced. As a result, it becomes easy to form the solenoid driving apparatus within a semiconductor chip, and therefore an inexpensive solenoid driving apparatus can be provided.

When the current detection is performed by an externally provided resistive element, a large number of pins are necessary for an integrated circuit that forms the solenoid driving apparatus, and also a complex current detecting circuit is required when it is highly precise and mounted to the integrated circuit. The foregoing solenoid driving apparatus according to the first embodiment, however, requires only one current detecting circuit, which facilitates the construction thereof in the integrated circuit.

Second Embodiment

A solenoid driving apparatus according to a second embodiment of the present invention will be described below. The solenoid driving apparatus according to the second embodiment has the simplified configuration of the solenoid driving apparatus according to the first embodiment.

Figure 5:
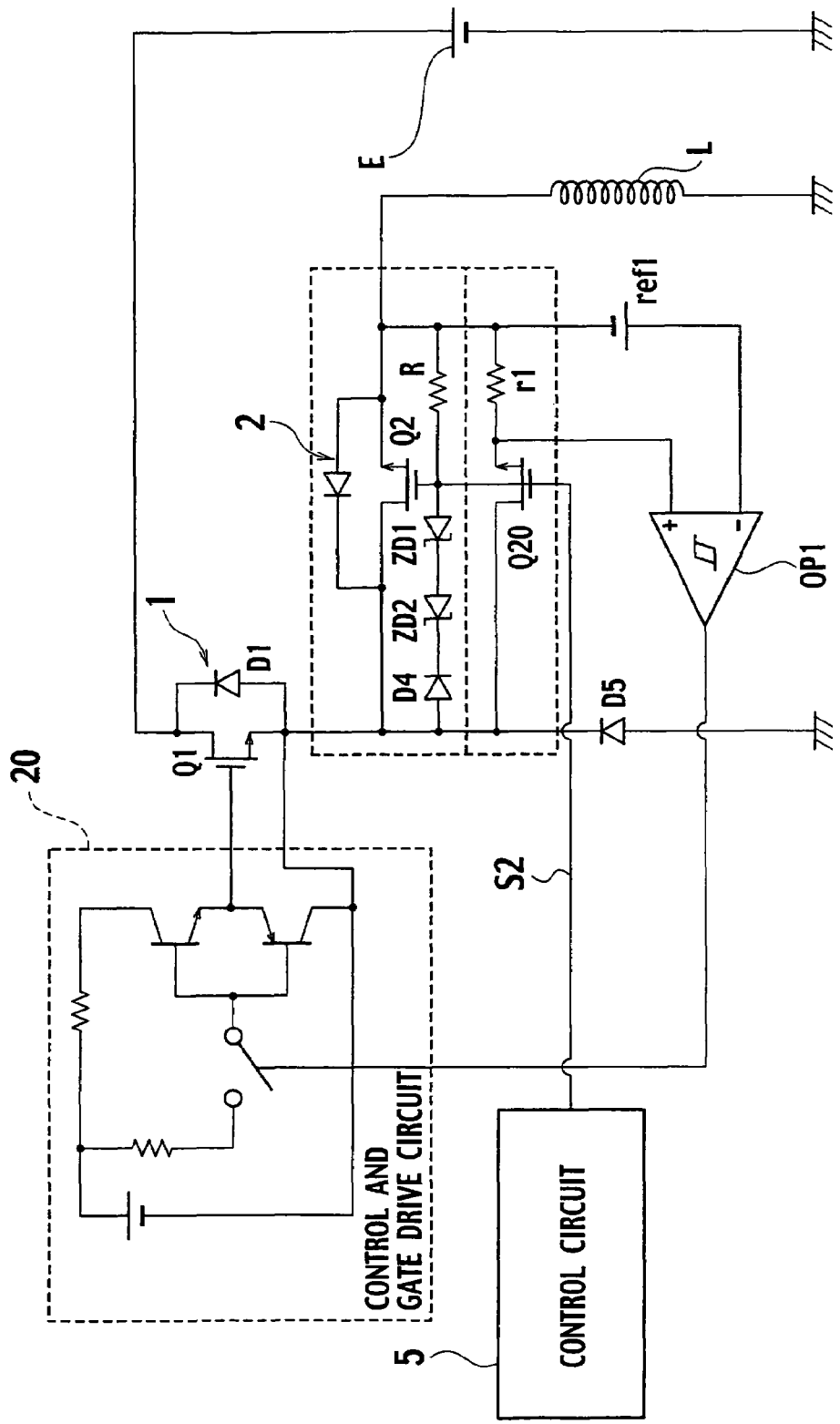
FIG. 5 shows the circuit structure of a solenoid driving apparatus according to a second embodiment of the present invention.

FIG. 5 shows the circuit structure of the solenoid driving apparatus according to the second embodiment of the present invention. The solenoid driving apparatus is characterized such that a diode D5 is employed instead of the third current switching element 3 which is used as the loop current circuit in the solenoid driving apparatus according to the first embodiment, and also a hysteresis comparator (Schmitt circuit) OP1 is employed instead of the differential amplifier 10 in order to send an output of the hysteresis comparator OP1 directly (bypassing the control circuit 5) to the gate drive circuit 20.

Operations of the solenoid driving apparatus according to the second embodiment will be described with reference to the timing chart of FIG. 4.

Operations for constant-current control of the solenoid L are described. No current passes through the solenoid L when the second current switching element 2 is in a non-conductive state, and therefore the first current switching element 1 remains in a conductive state, but an exciting current does not pass through the solenoid L because the second current switching element 2 is off.

When the exciting current is supplied to the solenoid L, the second current switching element 2 is brought into a conductive state in response to a control signal S2 as shown in FIG. 4(b) and the first current switching element 1 is in a conductive state according to a control signal S1 being fed from the control circuit 5 as shown in FIG. 4(a). Therefore, voltage is applied to the solenoid L as shown in FIG. 4(d), and the exciting current is supplied from the battery E to the solenoid L through the first and the second current switching elements 1 and 2. The exciting current gradually increases with the slope determined by an inductance of the solenoid L as shown in FIG. 4(c).

When the exciting current reaches the first threshold value Vth1, the output of the hysteresis comparator OP1 indicates L-level which brings the first current switching element 1 into a non-conductive state. As a consequence, the solenoid L releases the stored energy by the loop current which gradually decreases with the slope determined by an inductance of the solenoid L. When this loop current falls down to the second threshold value Vth2, the output of the hysteresis comparator OP1 is inverted and then indicates H-level which brings the first current switching element 1 into a conductive state.

The above repetitive operations cause the first current switching element 1 to intermittently open and close, and the exciting current passing through the solenoid L is controlled in a current range determined by the first threshold value Vth1 and the second threshold value Vth2.

Operations for terminating the constant-current control of the solenoid L are the same as those performed in the solenoid driving apparatus according to the foregoing first embodiment.

As described above, according to the solenoid driving apparatus in the second embodiment, only ON/OFF operations of the second current switching element 2 in response to the control signal S2 fed from the control circuit 5 can start and stop the constant-current control for the solenoid L. Furthermore, the diode 5 is employed for passing the loop current and also the hysteresys comparator OP1 is employed to directly control the first current switching element 1, and therefore the circuit of the solenoid driving apparatus is simplified and inexpensive.

ADVANTAGES OF THE INVENTION

According to the first technical aspect of the present invention, both an exciting current and a loop current pass through the second current switching element, so that the number of current detecting circuits for measuring these exciting current and loop current is reduced to half of the conventional count.

According to the second technical aspect of the present invention, the loop current circuit comprises the third current switching element that turns ON and OFF exclusively with respect to the first current switching element, so that losses caused by the loop current can be reduced more compared to, for example, the case where a diode is used as loop current circuit. As a result, heat generation is suppressed in a solenoid driving apparatus formed of semiconductors, thereby leading to a miniaturized semiconductor package.

According to the third technical aspect of the present invention, the second current switching element operates as a current switching element when a control signal for turning on/off thereof is received, and is also operates as a constant-voltage circuit when no control signal is received. Therefore, the energy stored in the solenoid can be released in a short time when the second current switching element operates as the constant-voltage circuit.

According to the fourth technical aspect of the present invention, the value of a current passing through the second current switching element is detected, and a control signal is generated based on this detected current value, so that constant-current control can be provided with high accuracy. Furthermore, the number of current detection circuits can be decreased to half compared to a solenoid driving apparatus to which the conventional current detecting circuits are applied, so that the size of the circuitry can be reduced. As a result, it becomes easy to form a solenoid driving apparatus within a semiconductor chip, and therefore an inexpensive solenoid driving apparatus can be provided.

INDUSTRIAL APPLICABILITY

The present invention is applicable to a solenoid driving apparatus for driving a solenoid used for various controls of automobiles and the like.

This application claims benefit of priority under 35USC §119 to Japanese Patent Applications No. 2004-325103, filed on Nov. 9, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A solenoid driving apparatus that drives a solenoid by intermittently supplying an exciting current to the solenoid, comprising:
a first current switching element that is turned ON and OFF with a control signal so as to switchably allow and block passage of the exciting current being supplied to the solenoid;
a loop current circuit being connected to the first current switching element in which a loop current is caused by stored energy in the solenoid when the supply of the exciting current to the solenoid is stopped by the first current switching element;
a second current switching element being disposed between the solenoid and a junction of the first current switching element and the loop current circuit, the second current switching element being directly connected to the junction and being turned ON and OFF so as to switchably allow and block passage of the exciting current and the loop current;
a current detector configured to detect a current passing through the solenoid with the second current switching element throughout a period of constant current control for the solenoid; and
a control circuit configured to turn the first current switching element ON and OFF intermittently throughout the period of constant current control for the solenoid, according to the current value detected by the current detector, to provide constant current control for the solenoid.

2. The solenoid driving apparatus according to claim 1, wherein the loop current circuit is a third current switching element that is turned ON and OFF exclusively with respect to the first current switching element.

3. The solenoid driving apparatus according to claim 2, further comprising:
a control circuit that turns the second current switching element ON and OFF, wherein
the second current switching element operates as a current switching element when a control signal is received from the control circuit and operates as a constant-voltage circuit when no control signal is received.

4. The solenoid driving apparatus according to claim 1, further comprising:
a control circuit that turns the second current switching element ON and OFF, wherein
the second current switching element operates as a current switching element when a control signal is received from the control circuit and operates as a constant-voltage circuit when no control signal is received.

5. The solenoid driving apparatus according to claim 1, further comprising zener diodes between the drain and gate of the second current switching element that maintain a constant voltage at the second current switching element.

6. A solenoid driving apparatus for driving a solenoid by intermittently supplying an exciting current to the solenoid, including:
a means for turning a first current switching element ON and OFF with a control signal so as to switchably allow and block passage of the exciting current being supplied to the solenoid;
a means for connecting a loop current circuit to the first current switching element in which a loop current is caused by stored energy in the solenoid when the supply of the exciting current to the solenoid is stopped by the first current switching element;
a means for turning a second current switching element, which is disposed between the solenoid and a junction of the first current switching element and the loop current circuit and is directly connected to the junction, ON and OFF so as to switchably allow and block passage of the exciting current and the loop current;
a means for detecting a current passing through the second current switching element throughout a period of constant current control for the solenoid; and
a means for turning the first current switching element ON and OFF intermittently throughout the period of constant current control, according to the current value detected by the current detector, to provide constant current control for the solenoid.

7. The solenoid driving apparatus according to claim 6, including a means for turning the loop current circuit ON and OFF exclusively with respect to the first current switching element.

8. The solenoid driving apparatus according to claim 7, including a means for causing the second current switching element to operate as a current switching element when a control signal is received from the control circuit and to operate as a constant-voltage circuit when no control signal is received.

9. The solenoid driving apparatus according to claim 6, including a means for causing the second current switching element to operate as a current switching element when a control signal is received from the control circuit and to operate as a constant-voltage circuit when no control signal is received.

* * * * *